US 8,459,689 B2
Jun. 11, 2013

(12) United States Patent
Roychoudhury

(54) PASSENGER SIDE ACTIVE KNEE BOLSTER

(75) Inventor: Raj S. Roychoudhury, Bloomfield Hills, MI (US)

(73) Assignee: Salflex Polymers Ltd., Weston, Ontario (CA)

( * ) Notice: Subject to any disclaimer, the term of this patent is extended or adjusted under 35 U.S.C. 154(b) by 0 days.

(21) Appl. No.: 12/978,139

(22) Filed: Dec. 23, 2010

(65) Prior Publication Data
US 2011/0198827 A1 Aug. 18, 2011

Related U.S. Application Data

(60) Provisional application No. 61/290,069, filed on Dec. 24, 2009.

(51) Int. Cl.
*B60R 21/16* (2006.01)
(52) U.S. Cl.
USPC ......... 280/730.1; 280/750; 280/751; 280/752
(58) Field of Classification Search
USPC ............... 280/728.2, 730.1, 743.1, 750, 751, 280/752
See application file for complete search history.

(56) References Cited

U.S. PATENT DOCUMENTS

| | | |
|---|---|---|
| 2,834,606 A | 5/1958 | Bertrand |
| 3,185,497 A | 5/1965 | Lagace |
| 3,473,824 A | 10/1969 | Carey et al. |
| 3,963,362 A | 6/1976 | Hollis |
| 3,981,518 A | 9/1976 | Pulling |
| 4,203,616 A | 5/1980 | Okada |
| 4,297,051 A | 10/1981 | Robinson |
| 4,362,425 A | 12/1982 | Dixon |
| 4,511,281 A | 4/1985 | Schmanski |
| 4,518,172 A | 5/1985 | Bortz et al. |
| 4,597,691 A | 7/1986 | Clarke |
| 4,721,329 A | 1/1988 | Brantman et al. |
| 4,951,963 A | 8/1990 | Behr et al. |
| 5,082,310 A | 1/1992 | Bauer |
| 5,138,721 A | 8/1992 | Spector |
| 5,273,309 A | 12/1993 | Lau et al. |

(Continued)

FOREIGN PATENT DOCUMENTS

| | | |
|---|---|---|
| AT | 404746 | 2/1999 |
| DE | 1112266 | 8/1961 |

(Continued)

OTHER PUBLICATIONS

U.S. Appl. No. 11/560,473 Office Action dated Mar. 15, 2010.

(Continued)

*Primary Examiner* — Toan To
(74) *Attorney, Agent, or Firm* — Michael Best & Friedrich LLP

(57) ABSTRACT

An energy management system for mounting in a vehicle, the energy management system comprising an inflatable bolster for mounting in a glove box door of a glove box of the vehicle, the inflatable bolster including an expansible hollow interior, an inflator module for inflating the expansible hollow interior, a front wall for projecting inwardly into the vehicle and away from the glove box on inflation of the expansible hollow interior, and a back wall located between the expansible hollow interior and the glove box, and a support structure for mounting to the inflatable bolster, the support structure being operable to resist the back wall being forced into the glove box due to inflation of the inflatable bolster.

23 Claims, 13 Drawing Sheets

U.S. PATENT DOCUMENTS

| | | | |
|---|---|---|---|
| 5,312,133 A | 5/1994 | Pietila et al. | |
| 5,324,070 A | 6/1994 | Kitagawa et al. | |
| 5,324,072 A | 6/1994 | Olson et al. | |
| 5,364,125 A | 11/1994 | Brown et al. | |
| 5,370,417 A | 12/1994 | Kelman et al. | |
| 5,382,051 A | 1/1995 | Glance | |
| 5,447,326 A | 9/1995 | Laske et al. | |
| 5,456,490 A | 10/1995 | Carter et al. | |
| 5,476,283 A | 12/1995 | Elton | |
| 5,498,026 A | 3/1996 | Eckhout | |
| 5,524,924 A | 6/1996 | Steffens, Jr. et al. | |
| 5,533,748 A | 7/1996 | Wirt et al. | |
| 5,536,043 A | 7/1996 | Lang et al. | |
| 5,544,913 A | 8/1996 | Yamanishi et al. | |
| 5,556,128 A | 9/1996 | Sinnhuber et al. | |
| 5,567,375 A | 10/1996 | Filion et al. | |
| 5,615,914 A | 4/1997 | Galbraith et al. | |
| 5,630,621 A | 5/1997 | Schneider | |
| 5,716,093 A | 2/1998 | Sadr | |
| 5,718,449 A | 2/1998 | Numazawa et al. | |
| 5,775,729 A | 7/1998 | Schneider et al. | |
| 5,816,613 A | 10/1998 | Specht et al. | |
| 5,845,937 A | 12/1998 | Smith | |
| 5,865,468 A | 2/1999 | Hur | |
| 5,927,755 A | 7/1999 | Matsuo et al. | |
| D412,880 S | 8/1999 | Sadr | |
| 5,931,493 A | 8/1999 | Sutherland | |
| 5,957,493 A | 9/1999 | Larsen et al. | |
| 5,967,594 A | 10/1999 | Ramanujam | |
| 5,968,431 A | 10/1999 | Ang et al. | |
| 6,032,978 A | 3/2000 | Spencer et al. | |
| 6,131,950 A | 10/2000 | Schroter | |
| 6,142,520 A | 11/2000 | Iino et al. | |
| 6,158,766 A | 12/2000 | Kowalski | |
| 6,170,871 B1 | 1/2001 | Goestenkors et al. | |
| 6,193,272 B1 | 2/2001 | Aigner et al. | |
| 6,203,057 B1 | 3/2001 | Spencer et al. | |
| 6,213,497 B1 | 4/2001 | Spencer et al. | |
| 6,231,072 B1 | 5/2001 | Pywell et al. | |
| 6,250,665 B1 | 6/2001 | Sutherland et al. | |
| 6,302,437 B1 | 10/2001 | Marriott et al. | |
| 6,305,710 B1 | 10/2001 | Bosgieter et al. | |
| 6,336,653 B1 | 1/2002 | Yaniv et al. | |
| 6,338,501 B1 | 1/2002 | Heilig et al. | |
| 6,416,079 B1 | 7/2002 | Lutz et al. | |
| 6,435,554 B1 | 8/2002 | Feldman | |
| 6,471,242 B2 | 10/2002 | Schneider | |
| 6,517,103 B1 | 2/2003 | Schneider | |
| 6,536,802 B1 * | 3/2003 | Sutherland et al. | 280/752 |
| 6,543,838 B2 | 4/2003 | Bertolini et al. | |
| 6,568,743 B1 | 5/2003 | Jayasuriya et al. | |
| 6,578,867 B2 | 6/2003 | Khoudari et al. | |
| 6,588,557 B2 | 7/2003 | Williams et al. | |
| 6,619,689 B2 | 9/2003 | Spencer et al. | |
| 6,688,643 B2 | 2/2004 | Schneider | |
| 6,712,385 B2 | 3/2004 | Enders | |
| 6,715,789 B2 | 4/2004 | Takimoto et al. | |
| 6,752,417 B2 | 6/2004 | Takimoto et al. | |
| 6,758,493 B2 | 7/2004 | Conlee et al. | |
| 6,817,625 B2 | 11/2004 | Hjerpe | |
| 6,817,627 B2 | 11/2004 | Galmiche et al. | |
| 6,848,715 B2 | 2/2005 | Nelson et al. | |
| 6,874,811 B2 | 4/2005 | Enders et al. | |
| 6,971,667 B2 | 12/2005 | Enders et al. | |
| 6,976,706 B2 | 12/2005 | Smith et al. | |
| 6,991,252 B2 | 1/2006 | Enders | |
| 7,021,652 B2 | 4/2006 | Kumagai et al. | |
| 7,055,083 B2 | 5/2006 | Wang | |
| 7,055,853 B2 | 6/2006 | Honda et al. | |
| 7,086,663 B2 | 8/2006 | Honda | |
| 7,093,846 B2 | 8/2006 | Reiter et al. | |
| 7,093,851 B2 | 8/2006 | Lotspih | |
| 7,144,032 B2 | 12/2006 | Lunt et al. | |
| 7,168,733 B2 | 1/2007 | Kumagai et al. | |
| 7,213,840 B2 | 5/2007 | Kumagai | |
| 7,249,781 B2 | 7/2007 | Kai et al. | |
| 7,322,598 B2 | 1/2008 | Galmich et al. | |
| 7,350,852 B2 | 4/2008 | Rust et al. | |
| 7,367,587 B2 | 5/2008 | Taoka | |
| 7,393,013 B2 | 7/2008 | Best et al. | |
| 7,396,040 B2 | 7/2008 | Enders et al. | |
| 7,413,215 B2 | 8/2008 | Weston et al. | |
| 7,422,234 B2 | 9/2008 | Huber et al. | |
| 7,448,645 B2 | 11/2008 | Bederka et al. | |
| 7,481,457 B2 | 1/2009 | Best et al. | |
| 7,568,722 B2 | 8/2009 | Sato et al. | |
| 7,578,518 B2 | 8/2009 | Ochiai et al. | |
| 7,735,865 B2 | 6/2010 | Cappabianca et al. | |
| 7,874,587 B2 * | 1/2011 | Miki et al. | 280/752 |
| 7,980,589 B2 | 7/2011 | Best et al. | |
| 8,146,943 B2 * | 4/2012 | Fukawatase et al. | 280/739 |
| 2001/0054811 A1 | 12/2001 | Spencer et al. | |
| 2002/0125691 A1 | 9/2002 | Conlee et al. | |
| 2002/0171231 A1 | 11/2002 | Takimoto et al. | |
| 2003/0127819 A1 | 7/2003 | Richardson | |
| 2003/0197354 A1 | 10/2003 | Beland et al. | |
| 2004/0007856 A1 | 1/2004 | Enders et al. | |
| 2004/0075251 A1 | 4/2004 | Fujii et al. | |
| 2004/0075252 A1 | 4/2004 | Pan | |
| 2004/0099644 A1 | 5/2004 | Allen | |
| 2004/0100075 A1 | 5/2004 | Sakai et al. | |
| 2004/0135353 A1 | 7/2004 | Enders et al. | |
| 2004/0145163 A1 | 7/2004 | Galmiche et al. | |
| 2004/0155447 A1 | 8/2004 | Smith et al. | |
| 2004/0163872 A1 | 8/2004 | Lincoln et al. | |
| 2004/0163873 A1 | 8/2004 | Polz et al. | |
| 2004/0178616 A1 | 9/2004 | Yoshikawa | |
| 2004/0232666 A1 | 11/2004 | Sato et al. | |
| 2005/0023802 A1 | 2/2005 | Enders et al. | |
| 2005/0029781 A1 | 2/2005 | Enders et al. | |
| 2005/0052005 A1 | 3/2005 | Lunt et al. | |
| 2005/0052010 A1 | 3/2005 | Best et al. | |
| 2005/0052011 A1 | 3/2005 | Best et al. | |
| 2005/0057024 A1 | 3/2005 | Weston et al. | |
| 2005/0073134 A1 * | 4/2005 | Matsuura et al. | 280/730.1 |
| 2005/0098996 A1 | 5/2005 | Enders | |
| 2005/0116449 A1 * | 6/2005 | Enders | 280/730.1 |
| 2005/0253369 A1 | 11/2005 | Taoka | |
| 2006/0214400 A1 | 9/2006 | Enders et al. | |
| 2007/0007753 A1 | 1/2007 | Williams et al. | |
| 2007/0052219 A1 | 3/2007 | Rust et al. | |
| 2007/0108746 A1 | 5/2007 | Ochiai et al. | |
| 2007/0108747 A1 | 5/2007 | Roychoudhury et al. | |
| 2007/0152431 A1 | 7/2007 | Rust et al. | |
| 2007/0273179 A1 | 11/2007 | Hommel et al. | |
| 2007/0296187 A1 | 12/2007 | Ochiai | |
| 2008/0061537 A1 | 3/2008 | Enders | |
| 2008/0203714 A1 | 8/2008 | Untersinger et al. | |
| 2009/0152848 A1 | 6/2009 | Sadr et al. | |
| 2009/0152849 A1 | 6/2009 | Saraf et al. | |
| 2009/0250915 A1 | 10/2009 | Best et al. | |
| 2010/0052296 A1 * | 3/2010 | Sasaki et al. | 280/730.1 |
| 2010/0194081 A1 * | 8/2010 | Thomas et al. | 280/730.1 |
| 2010/0320736 A1 | 12/2010 | Traber et al. | |
| 2010/0327566 A1 * | 12/2010 | Matsushima | 280/728.2 |
| 2011/0109064 A1 | 5/2011 | Best et al. | |
| 2011/0115201 A1 | 5/2011 | Best et al. | |
| 2011/0123739 A1 | 5/2011 | Ciplijauskas et al. | |
| 2011/0133435 A1 | 6/2011 | Sadr et al. | |
| 2011/0156378 A1 * | 6/2011 | Matsushima et al. | 280/730.1 |
| 2012/0080871 A1 | 4/2012 | Roychoudhury et al. | |

FOREIGN PATENT DOCUMENTS

| | | |
|---|---|---|
| DE | 3737081 | 5/1989 |
| DE | 19546143 | 6/1997 |
| DE | 19858520 | 4/2000 |
| DE | 10123207 | 7/2002 |
| EP | 0274535 | 7/1988 |
| EP | 0678425 | 10/1995 |
| EP | 0684164 | 11/1995 |
| EP | 0872390 | 10/1998 |
| EP | 1426249 | 6/2004 |
| EP | 1663725 | 12/2009 |
| GB | 2272670 | 5/1994 |
| JP | 57058532 | 4/1982 |
| JP | 63-002741 | 1/1988 |
| JP | 63207744 | 8/1988 |

| | | |
|---|---|---|
| JP | 282946 | 6/1990 |
| JP | 2249740 | 10/1990 |
| JP | 5016758 | 1/1993 |
| JP | 06-037011 | 5/1994 |
| JP | 7291084 | 11/1995 |
| JP | H08-258604 | 10/1996 |
| JP | 10504784 | 5/1998 |
| JP | 10512210 | 11/1998 |
| JP | H11-028998 | 2/1999 |
| JP | 11-091454 | 4/1999 |
| JP | 11334515 | 12/1999 |
| JP | 2000006751 | 1/2000 |
| JP | 2000-326810 | 11/2000 |
| JP | 2002-522286 | 7/2002 |
| JP | 2003517966 | 6/2003 |
| JP | 2004026126 | 1/2004 |
| JP | 2004182231 | 7/2004 |
| JP | 2004249960 | 9/2004 |
| JP | 2004-338677 | 12/2004 |
| JP | 2007-504050 | 3/2007 |
| JP | 2007090954 | 4/2007 |
| JP | 04083653 | 4/2008 |
| JP | 04136876 | 8/2008 |
| WO | 00/07851 | 2/2000 |
| WO | 00/50270 | 8/2000 |
| WO | 2004/071818 | 8/2004 |
| WO | 2006/132990 | 12/2006 |
| WO | 2007/056849 | 5/2007 |
| WO | 2009/124394 | 10/2009 |
| WO | 2009/124395 | 10/2009 |
| WO | 2009/124401 | 10/2009 |

OTHER PUBLICATIONS

U.S. Appl. No. 11/560,473 Office Action dated Oct. 22, 2010.
U.S. Appl. No. 11/560,473 Advisory Action dated Jan. 12, 2011.
U.S. Appl. No. 11/915,797 Office Action dated Feb. 18, 2010.
U.S. Appl. No. 11/915,797 Office Action dated Apr. 14, 2010.
U.S. Appl. No. 12/422,389 Office Action dated Mar. 17, 2010.
U.S. Appl. No. 12/422,389 Office Action dated Nov. 8, 2010.
U.S. Appl. No. 12/422,389 Advisory Action dated Jan. 24, 2011.
U.S. Appl. No. 12/422,389 Advisory Action dated Feb. 22, 2011.
Anonymous "Inflatable Bellows-Box Panel" Research Disclosure, Mason Publications, Hampshire, Great Britain, vol. 374, No. 9 (Jun. 1, 1995).
Canadian Patent Application No. 2,535,661 Notice of Allowance dated Feb. 1, 2010.
Canadian Patent Application No. 2,535,661 Office Action dated Jan. 20, 2009.
European Patent Application No. 04761769.1 Examination Report dated Mar. 23, 2007.
European Patent Application No. 04761769.1 Communication under Rule 71(3) EPC dated Jul. 1, 2009.
European Patent Application No. 04761769.1 Decision to Grant dated Nov. 19, 2009.
European Patent Application No. 04761769.1 Supplementary European Search Report dated Nov. 1, 2006.
European Patent Application No. 06771989.8 Supplementary European Search Report dated Feb. 8, 2010.
European Patent Application No. 06771989.8 Examination Report dated May 21, 2010.
European Patent Application No. 06804728.1 Communication under Rule 71(3) EPC dated Jun. 14, 2010.
European Patent Application No. 06804728.1 Examination Report dated Oct. 27, 2009.
European Patent Application No. 06804728.1 Response to European Examination Report dated Mar. 3, 2010.
European Patent Application No. 06804728.1 Supplementary European Search Report dated Jun. 15, 2009.
International Patent Application No. PCT/CA2004/001605 International Search Report dated Feb. 8, 2005.
International Patent Application No. PCT/CA2006/001862 International Preliminary Report on Patentability dated May 29, 2008.
International Patent Application No. PCT/CA2006/001862 International Search Report and Written Opinion dated Feb. 1, 2007.
International Patent Application No. PCT/CA2009/000475 International Search Report dated Jul. 7, 2009.
International Patent Application No. PCT/CA2009/000476 International Search Report and Written Opinion dated Jul. 28, 2009.
International Patent Application No. PCT/CA2009/000507 International Search Report dated Jul. 14, 2009.
International Patent Application No. PCT/US2006/021507 International Search Report and Written Opinion dated Oct. 26, 2006.
International Patent Application No. PCT/US2006/021507 International Preliminary Report on Patentability dated Dec. 6, 2007.
Japanese Patent Application No. 2006-525586 Office Action dated Apr. 6, 2010.
European Patent Application No. 06771989.8 Examination Report dated Feb. 2, 2011.
International Search Report and Written Opinion of the International Searching Authority, International Patent Application No. PCT/CA2011/000518, mailed Aug. 11, 2011.
U.S. Appl. No. 13/180,182 Office Action dated Dec. 21, 2012 (9 pages).
U.S. Appl. No. 12/937,100 Office Action dated Dec. 6, 2012 (6 pages).
Office Action in relation to U.S. Appl. No. 12/955,491, mailed on May 10, 2011.
U.S. Appl. No. 12/955,491 Office Action dated Jun. 24, 2011.
U.S. Appl. No. 12/937,104 Office Action dated Aug. 15, 2012.
Japanese Office Action for Application No. 2008-514914 dated Aug. 31, 2011, 6 pages.
English translation of DE10123207; Publication Date: Jul. 4, 2002; Country: DE; Inventar: Tietz Werner; Assignee: Audi NSU Auto Union AG.
German Patent Application No. 112009000827.5 Office Action dated Apr. 16, 2012 (English Translation and Original).
European Search Report for Application No. 12168676.0 dated Jun. 26, 2012.
U.S. Appl. No. 12/937,096 Office Action dated Aug. 24, 2012.
Office Action from the Korean Intellectual Property Office for Application No. 10-2007-7030970 dated Jan. 17, 2013 (14 pages).
Office Action from the United States Patent and Trademark Office for U.S. Appl. No. 13/215,892, dated Apr. 16, 2013 (11 pages).

* cited by examiner

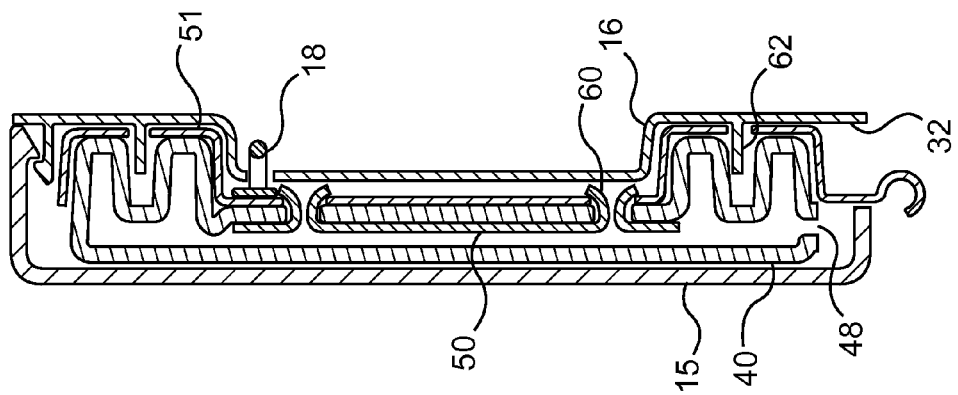
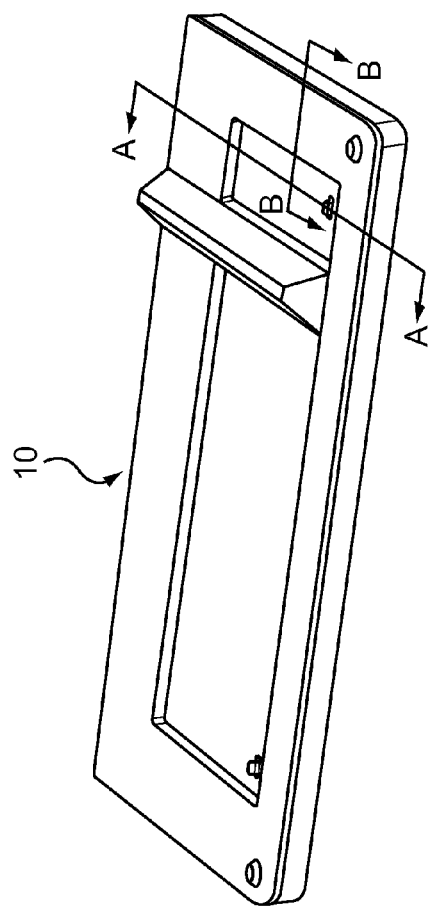
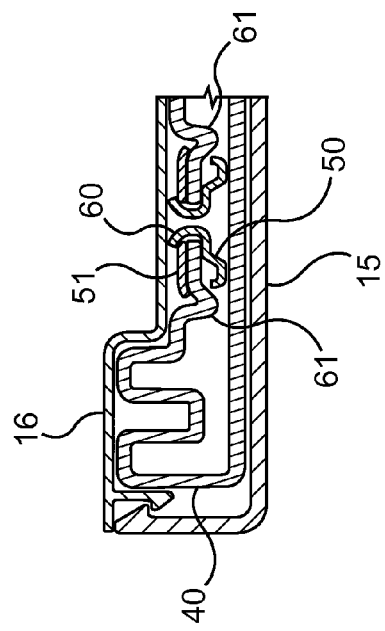
FIG. 6A
FIG. 6B
FIG. 6C

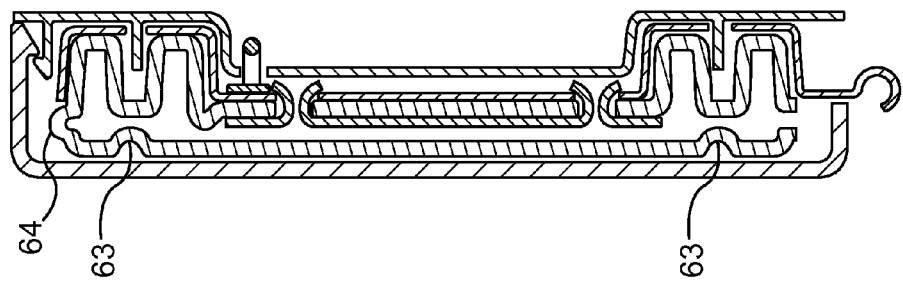
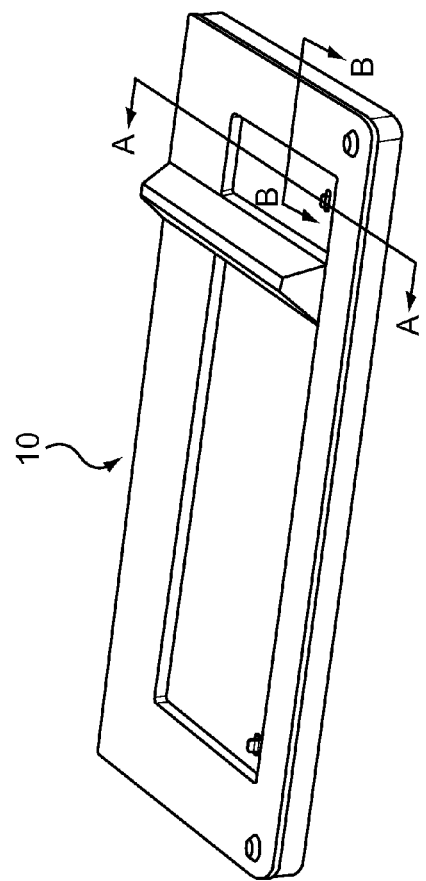
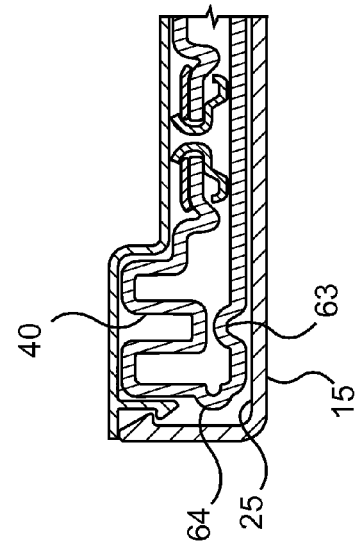

PASSENGER SIDE ACTIVE KNEE BOLSTER

CROSS REFERENCE TO RELATED APPLICATIONS

This application claims priority to and the benefit of U.S. Provisional Patent Application No. 61/290,069, filed Dec. 24, 2009, the entire contents of which are hereby incorporated by reference.

FIELD OF THE INVENTION

The present invention relates to energy management systems and more particularly to an energy management system located within an operable glove box door at a passenger side of a vehicle for a frontal impact event.

BACKGROUND AND SUMMARY OF THE INVENTION

Inflatable bolsters have been developed to improve vehicle occupant protection in the event of sudden vehicle deceleration. A conventional bolster is mounted within a vehicle passenger compartment and includes a hollow body and an inflator for injecting a pressurized fluid into the hollow body. In order to reduce the potential for injuries the inflator is activated upon detection of such an event and the bolster is inflated to form a cushion.

Known in the art are the following patent and patent applications which disclose inflatable bolsters and like: U.S. Pat. No. 6,032,978, U.S. Pat. No. 6,203,057, U.S. Pat. No. 6,213,497, U.S. Pat. No. 6,305,710, U.S. Pat. No. 6,517,103, U.S. Pat. No. 6,578,867, U.S. Pat. No. 6,619,689, U.S. Pat. No. 6,758,493, U.S. Pat. No. 6,976,706, U.S. Pat. No. 7,350,852, US2007/0108747, US2009/0152848, US2009/0250915, WO2006/132990, WO2009/124394, WO2009/124395, and WO2009/124401.

One prior passenger side active knee bolster comprises a storage bin and a hinging door. The door comprises a polymeric expansible body having a face portion towards a vehicle occupant and a back portion in opposing relation. The expansible body is connected to an inflator such that upon discharge of a gas, the face portion is projected outwardly to an extended position so as to intercept lower extremities of the occupant.

While such a construction may provide a desired degree of protection there is a need for a means to meet space restrictions on the passenger side of the vehicle and a need to meet interior design flexibility, glove box storage capacity and appearance requirements. Current safety devices present vehicle packaging difficulties and may not represent the most cost effective approaches to protecting occupants of a vehicle.

While such a construction may provide a desired degree of protection there is a need for a means to reduce occupant injuries in out of position situations. Current safety devices present dangers because of high output inflators employed for their inflation.

The passenger side active knee bolster of the present invention addresses these requirements. The improved functionality arises from an increase in internal glove box volume by minimizing inflatable chamber thickness of the glove box door assembly through support structure design. It is advantageous to have a reduced initial bladder volume requiring a lower inflator output.

Further areas of applicability of the present invention will become apparent from the description provided hereinafter. It should be understood that the description and specific examples, while indicating the preferred embodiment of the invention are intended for purposes of illustration only and are not intended to limit the scope of the invention.

BRIEF DESCRIPTION OF THE DRAWINGS

The present invention will become more fully understood from the detailed description and the accompanying drawings wherein:

FIGS. 6A, 6B, 6C are perspective and sectional views of a passenger side active bolster in accordance with another embodiment of the present invention shown with an injection molded outer trim panel;

FIGS. 7A, 7B, 7C are perspective and sectional views of a passenger side active bolster in accordance with another embodiment of the of the present invention shown with an injection molded outer trim panel;

DETAILED DESCRIPTION OF THE PREFERRED EMBODIMENTS

The following description of the preferred embodiment(s) is merely exemplary in nature and is in no way intended to limit the invention, its application, or uses.

Figure 1:
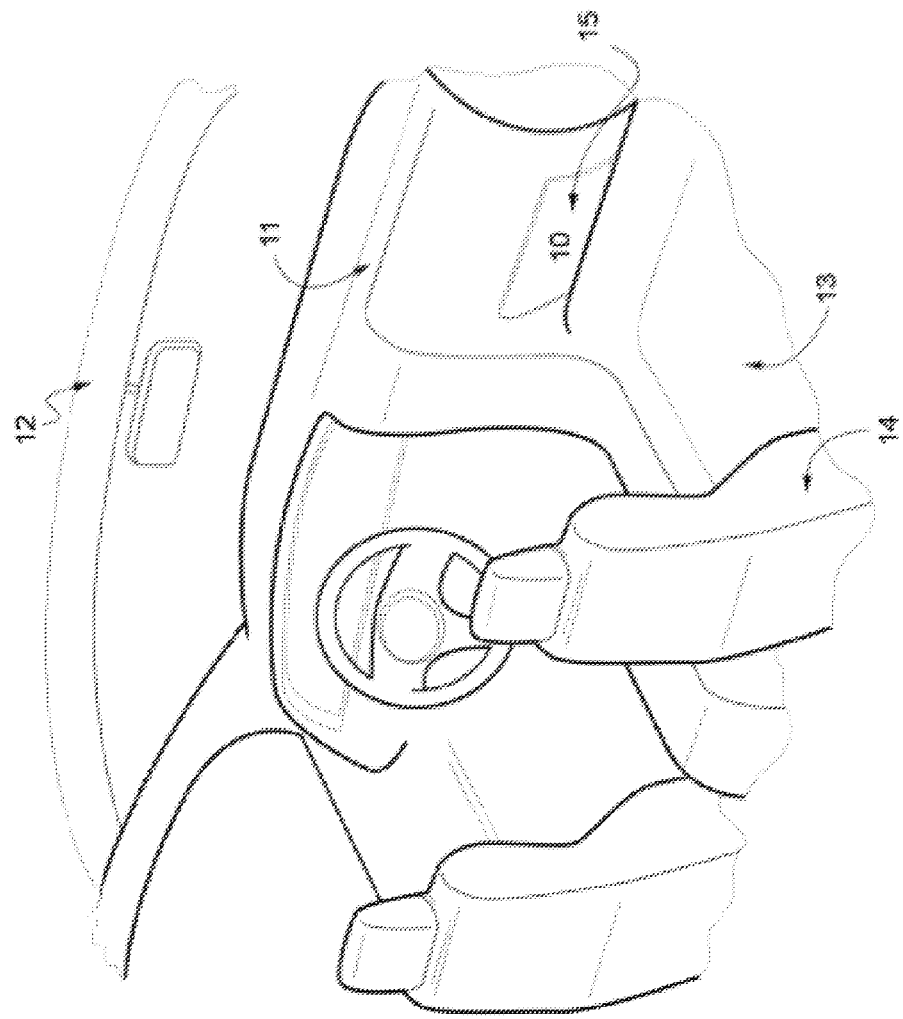
FIG. 1 is a perspective view of a vehicle interior.

In FIG. 1 the integration of the passenger side knee bolster consisting of a glove box assembly 10 within the front dash panel 11 of a vehicle 12 interior 13 is shown. A passenger seat 14 is located opposing a glove box door 15 which is part of the dash panel 11. The glove box door portion 15 can be opened by a remote latching mechanism or a latching mechanism incorporated in the glove box door as is known to those skilled in the art.

Figure 2:
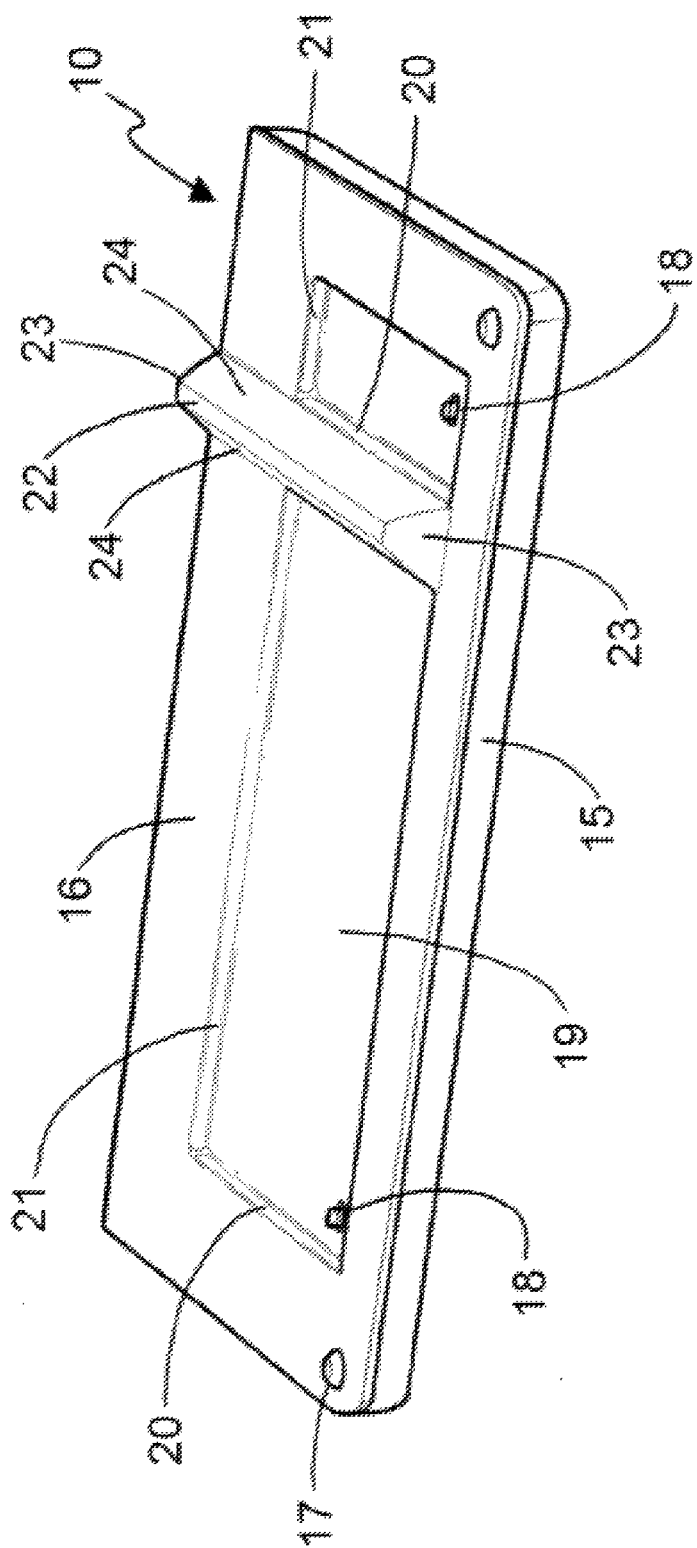
FIG. 2 is a perspective view of a passenger side active bolster in accordance with the principles of the present invention.

As illustrated in FIG. 2 the glove box assembly 10 includes a rigid bin portion 16 that extends away from the door portion 15. A stopper 17 on the bin portion 16 limits motion of the door in its closed position. A striker member 18 projects from the external support structure 51 (which is not visible) through the bin portion 16. The striker member 18 may engage a corresponding latching mechanism (not shown) to hold the door portion 15 closed. The bin portion preferentially has a recessed cavity surface 19 with end walls 20 and sidewalls 21 that provides increased storage capacity than would be otherwise provided. A protrusion 22 with sidewalls 23 and end walls 24 on the rigid bin portion advantageously divides the bin portion 16 into two sections. The door portion 15 is constructed through selection of material and wall thickness to provide and tune the desired aesthetic and functional stiffness.

Figure 3:
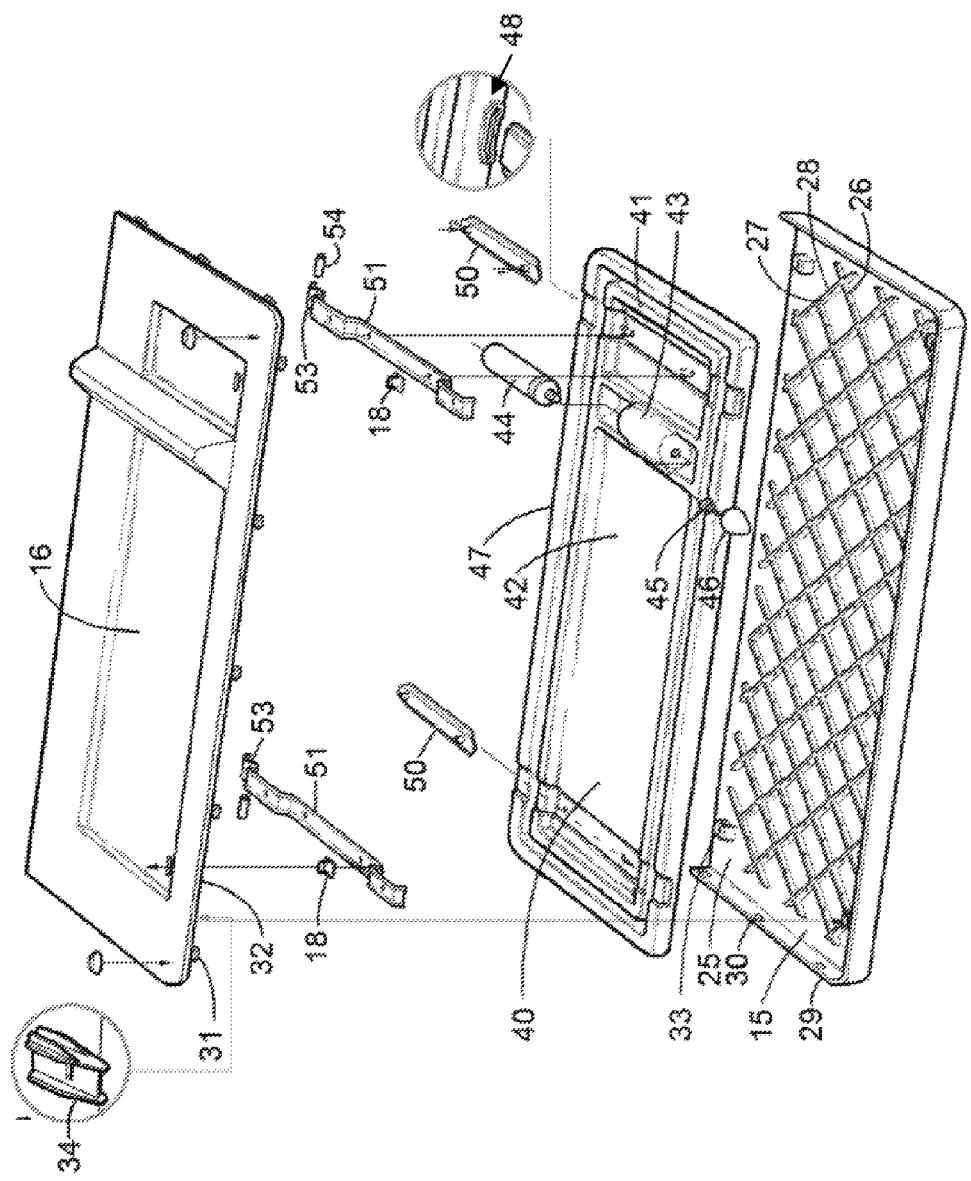
FIG. 3 is an exploded view of a passenger side active bolster in accordance with the principles of the present invention shown with an injection molded outer trim panel.

FIG. 3 shows an exploded view of one of the preferred embodiments of the passenger side active bolster glove box assembly 10. On the back surface 25 of the door portion 15, ribs 26 with substantially vertical wall protrusions 27 from the back surface 25 of the door portion 15. In other words, the wall protrusions extend in a substantially orthogonal or perpendicular manner from the back surface 25 of the door portion 15. The ribs 26 preferentially form a grid pattern. The vertical wall protrusions 27 may be of varying cross-section. A reduction in cross-section in the vertical wall protrusions 27 may be advantageously friable during the inflation process. In other words, portions of the protrusions 27 may crumble during inflation of the bolster, to reduce the force of the door portion 15 pushed by the expansion of the bolster, contacting the passenger. There may be an indent on the top surface 28 of the rib 26 that upon fastening to the bladder 40 forms a hollow area. It may be desirable to have a hollow area between bladder 40 and door portion 15 that are in communication with each other to allow for pressure equalization. The sidewalls 29 of the door portion may have snap features 30 to engage mating snaps 31 on the unexposed inner surface 32 of bin portion 16. Protrusion forms 33 on the door portion 15 may be placed to engage clip towers 34. The corresponding mating surfaces 33, 34 may be optionally reversed between the door portion 15 and the bin portion 16.

The door portion 15 is preferably made by a thermoplastic molding process preferably an injection molding process with a filled or unfilled thermoplastic material preferably polypropylene, TPO, ABS, PC/ABS or PA. Non-petroleum based bio materials such as PLA may be used. Organic materials such as wood flour may be used as a filler or reinforcing material.

The door portion 15 may be advantageously of non-uniform thickness to adjust stiffness. Thickness reduction may include serrations to allow tearing during the deployment process.

In another embodiment, it is desirable that the door portion 15 be a thermoplastic cover that is chemically compatible with the bladder 40 for welding purposes. The preferred method of attachment of door portion 15 with bladder 40 is bonding upon infrared (IR) heating. Other bonding methods may be used including but not limited to hot plate welding, radio frequency heating, vibration welding, or ultrasonic welding In another embodiment mechanical fasteners or adhesives may be used to attach door portion 15 to bladder 40.

The bin portion 16 is preferably is made by a thermoplastic molding process preferably an injection molding process with a filled or unfilled thermoplastic material preferably polypropylene, TPO, ABS, PC/ABS or PA. Non-petroleum based bio materials such as PLA may be used. Organic materials such as wood flour may be used as a filler material.

The inflatable bolster portion 40, which may be referred to as the bladder 40, has an expansible hollow interior. Preferably pleats 41, ribs, or corrugations are located in the perimeter of the back wall 42 of bladder 40 to allow a larger volume to be realized upon inflation. The expansible hollow interior of bladder 40 may be configured to inflate in a direction substantially orthogonal to the passenger facing surface of the glove box door 15. A cylindrical protrusion 43 engages an inflator module 44, retaining nut 45 and impinging gas deflection cap 46.

In another embodiment the nut 45 is affixed to the impinging deflection cap 46 for the described assembly.

The glove box door assembly 10 may be operatively connected to at least one gas-emitting unit 44. The inflator module 44 is operable to inflate the expansible hollow interior of bladder 40. Preferably it is a cold gas, pyrotechnic inflator or hybrid inflator 44. The invention advantageously uses lower powered units. The glove box assembly 10 advantageously has an outward and upward deployment pattern toward an occupant during a frontal impact event upon the activation of inflator 44.

The bladder 40 is preferably made by the blow molding process from a thermoplastic. The preferred plastic is a polyolefin with elastic properties, in a wide range of operating temperatures, appropriate for deployment such as from Salflex Polymers with the designation Salflex™ 245.

Vent holes 48 are located in the bladder 40. Corresponding vent holes 48 are located on the lower sidewall 47 of door portion 15. Additional vent holes 48 or venting features may be located on the surfaces of the bladder 40 preferably on the lower sidewall 47 and the bin facing surface 42.

An internal or inner support structure 50, preferably channel shaped, is inserted in the bladder through a vent hole aperture 48 of similar shape to the inner support structure 50. In an embodiment the bladder 40 is made of a flexible material. The flexible material of the bladder 40 can allow for the deformation of the vent aperture 48 to accommodate entry of the inner support structure 50. Where the material of the bladder 40 is flexible, the vent aperture 48 does not need to match exactly the profile of the inner support structure 50. In an embodiment the support structure 50, 51 is made of metal. The inner support structure 50 is centrally positioned between the inflatable rib structures so as not to impede the extension of the pleats 41. An external or outer support structure 51 is preferably mechanically affixed to the internal support structure. In an embodiment, the striker feature 18 is mechanically affixed to the external support structure 51. In an embodiment the inner support structure 50 comprises two internal support strips 50 and the outer support structure 51 comprises two external support strips 51.

In an embodiment, with the vent hole 48 arrangement as shown in FIG. 3, the bladder 40 is advantageously protected and not subject to having foreign materials or objects entering the expansible hollow interior or internal structure of bladder 40. The downward orientation of the vent holes 48 advantageously allows for drainage of condensation or liquids that may get into the bladder 40.

The venting is advantageously adaptive by requiring a lower inflation output from the inflator 44 and providing a longer inflation retention period. In an embodiment the vent 48 is configured to release gas or air slowly to facilitate rapid expansion during inflation, despite the small volume of the expansible hollow interior of bladder 40, and also to provide a longer inflation retention period.

The support structure 50, 51 provides mechanical support to the bladder 40 during the deployment process causing the bladder 40 to expand away from the glove box and towards passenger seat 14 of vehicle 12. The support structure 50, 51 can block the bladder 40 from being pushed into the glove box during deployment. The support structure 50, 51 can also impede the bladder 40 from being dislodged from the glove box during deployment. The lower end of the external support 51 forms a hook 53 for the mating hinge structure (not shown) for attachment to dash panel 11. This hook may have a plastic element 54 made from a plastic preferably fluoropolymer, acetal or polyamide to reduce wear of the contact surface (not shown). The opposite end of the external support 51 can be a free end. The free end can have a latching mechanism 18, 56 that engages with the dash panel 11. In certain embodiments, as shown, for example, in FIG. 3 the latching mechanism that engages with the dash panel 11 is the striker 18. In certain embodiments, as shown, for example, in FIGS. 4 and 5 the latching mechanism that engages with the dash panel 11 is a pin 56.

Figure 4:
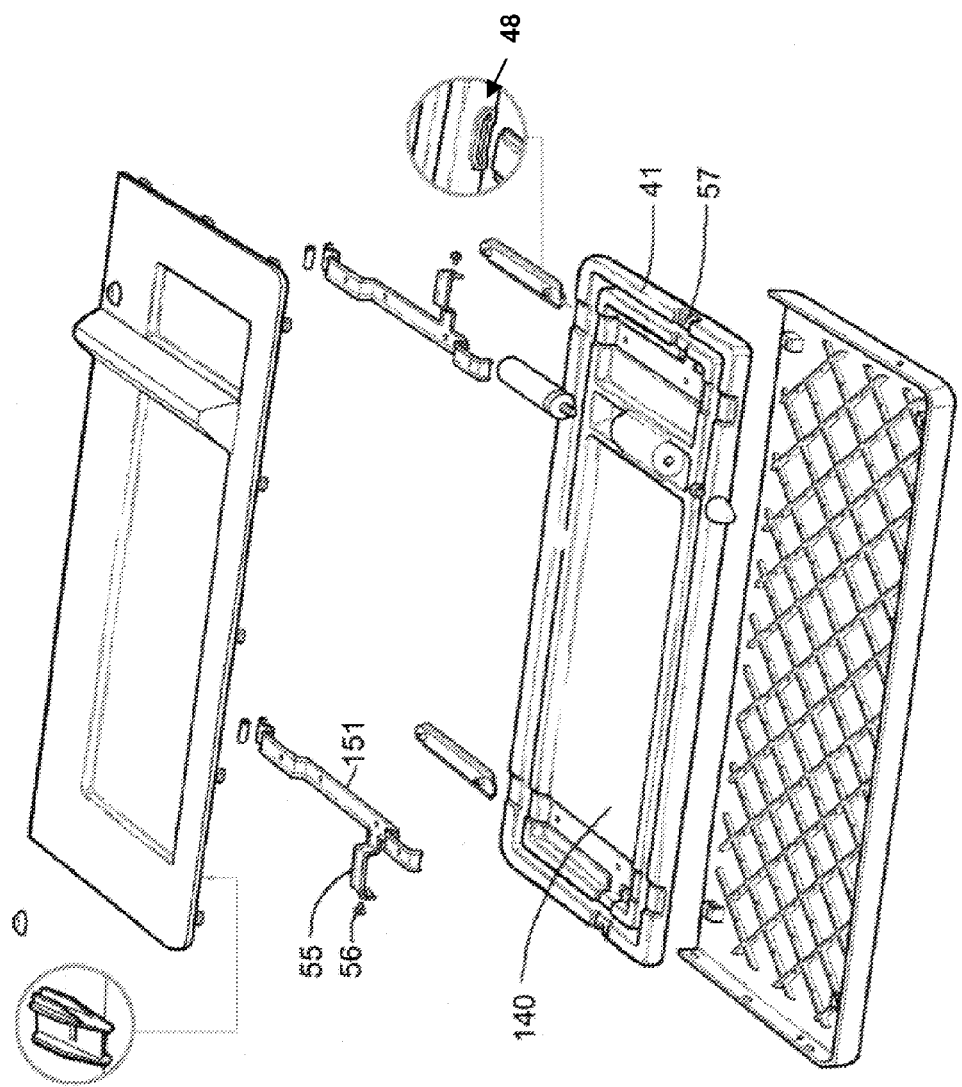
FIG. 4 is an exploded view of a passenger side active bolster in accordance with another embodiment of the present invention shown with an injection molded outer trim panel.
Figure 5:
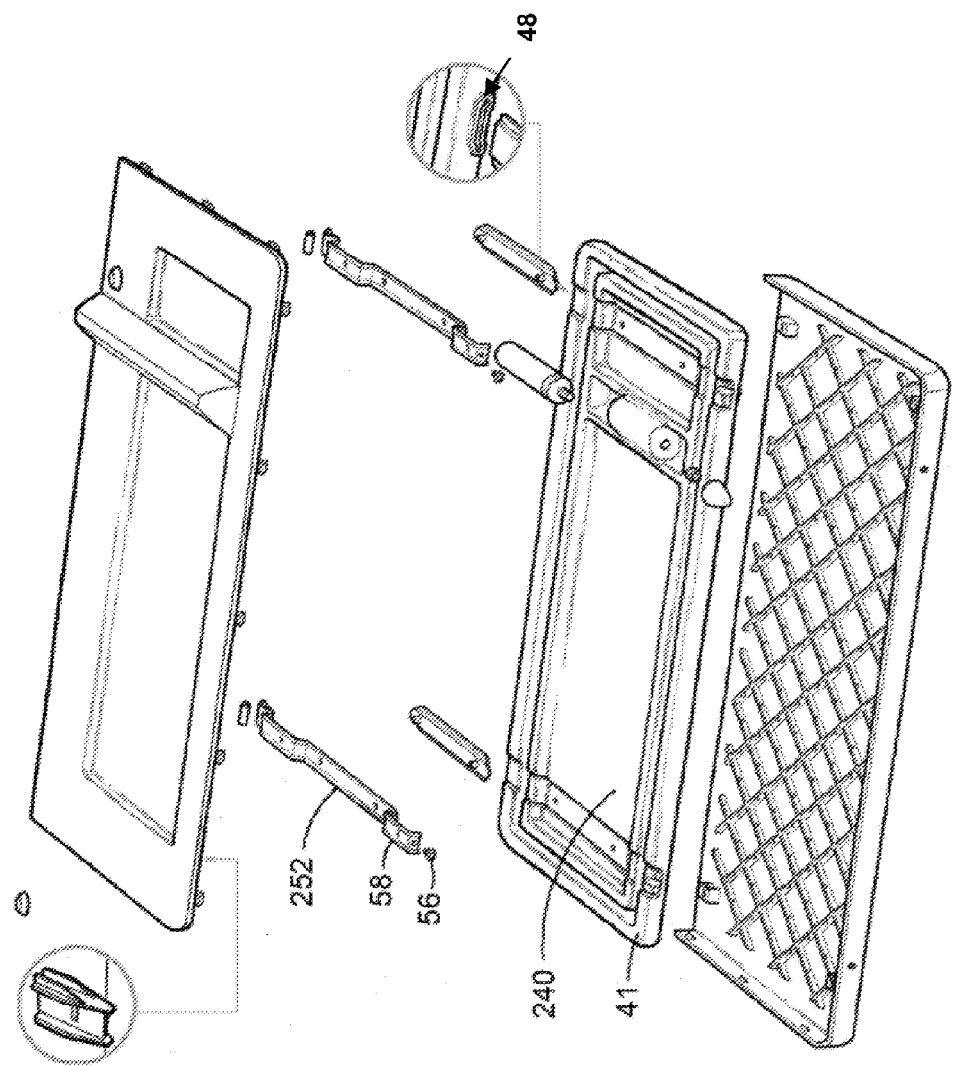
FIG. 5 is an exploded view of a passenger side active bolster in accordance with a yet further embodiment of the present invention, shown with an injection molded outer trim panel.

During deployment of the bladder 40, the glove box assembly 10 can be held in the front dash panel 11 by the external support structure 51 (as shown in FIG. 3), 151 (as shown in FIG. 4), 252 (as shown in FIG. 5) with hook 53 and striker 18 (as shown in FIGS. 2, 3, 6B, and 11) or pin 56 (as shown in FIGS. 4 and 5). The hook 53 may engage with the mating hinge structure (not shown) of the dash panel 11. For embodiments as shown in FIGS. 2, 3, 6B, and 11, the striker 18 may engage with a corresponding latching mechanism (not shown) on the dash panel 11. For embodiments as shown in FIGS. 4 and 5 the pin 56 may engage with a pin receptor in the mating surface (not shown) on the dash panel 11.

The latching mechanism 18, 56 can engage the free end(s) of the external support 51 to the dash panel 11. When the latching mechanism 18, 56 is engaged, the glove box door 15 is closed and can remain closed until the latching mechanism 18, 56 is disengaged. When the latching mechanism 18, 56 is disengaged the glove box door 15 can be opened to provide access to the glove box.

When the latching mechanism 18, 56 is engaged, the latching mechanism 18, 56 is operable to prevent the glove box door 15 from opening during deployment of the bladder 40. When the latching mechanism 18, 56 is being disengaged, the latching mechanism 18, 56 is preferably moved in a direction substantially orthogonal to the expansion direction of the bladder 40.

In certain embodiments, as shown, for example, in FIG. 3 where the latching mechanism is a striker 18 the engaging feature of the striker 18 can be oriented to extend in a direction substantially orthogonal to the direction of inflation the bladder 140, 240. To disengage the striker 18 from the dash panel 11 the striker 18 or the corresponding latching mechanism (not shown) moves substantially orthogonal to the direction of inflation of the bladder 140, 240.

In certain embodiments, as shown, for example, in FIGS. 4 and 5 where the latching mechanism is a pin 56. The pin 56 can be oriented in a direction substantially orthogonal to the direction of inflation of the bladder 140, 240. To disengage the pin 56 from the dash panel 11 the pin 56 or the corresponding pin receptor (not shown) can move substantially orthogonal to the direction of inflation of the bladder 140, 240.

Other hinge means (not shown) known to those skilled in the art including but not limited to living hinges, or piano hinges that can be integrally molded to the glove box assembly or mechanically attached as appropriate.

FIG. 4 shows an exploded view of another embodiment. The external support structure 151 has a section 55 with a pin 56. The bladder 140 has a depression 57 in the pleat 41 to accommodate section 55 and pin 56. This embodiment eliminates the need to use striker 18 as shown in FIG. 2 and uses the pin 56 that enters a pin receptor in the mating surface (not shown) to keep the glove box assembly 10 in the closed position.

FIG. 5 shows an exploded view of another embodiment. The external support structure 252 has a top end section 58 with a pin 56. The bladder 240 has a depression in the pleat 41 to accommodate the section 55 and pin 56. This embodiment eliminates the need to use a striker 18 as shown in FIG. 2 and uses the pin 56 that enters a pin receptor in the mating surface (not shown) to keep the glove box assembly 10 in the closed position.

FIG. 6A shows a perspective of the bolster glove box assembly 10 with cross-sectional view A-A of the preferred embodiment shown in FIG. 6B and cross-sectional view B-B of the preferred embodiment shown in FIG. 6C. The internal details of the bin portion are shown. Ribs 62 on surface 32 may protrude into the hollows formed between the inner surface 32 of the bin portion 16 and the bladder portion 40 of pleats 41. A guide way is formed by guides 61 of the bladder 40 to provide positioned installation of the inner support structure 50. Upon insertion of the inner support structure 50 through the vent hole aperture 48, the inner support structure 50 is engaged with the external support structure 51 by folding the end 60 to form a unified support structure 50, 51 sandwiching the bladder 40.

FIG. 7A shows a perspective of the bolster glove box assembly 10 with cross-sectional view A-A of another embodiment shown in FIG. 7B and cross-sectional view B-B of the preferred embodiment shown in FIG. 7C. The internal details of the bin portion are shown. Ribs 63 may protrude inward away from the inner surface 25 of the door portion 15. End wall ribs 64 may protrude outward from the bladder 40. The deployment distance and volume may be advantageously increased by using multiple surfaces of the bladder 40. With this embodiment, the bladder 40 at the locations of ribs 63, 64 would not be bonded to the inner wall 25 of the door panel 15 to take advantage of this additional design flexibility. The occupant facing surface of the bladder 40 may be advantageously stiffened by ribs 63.

Figure 8:
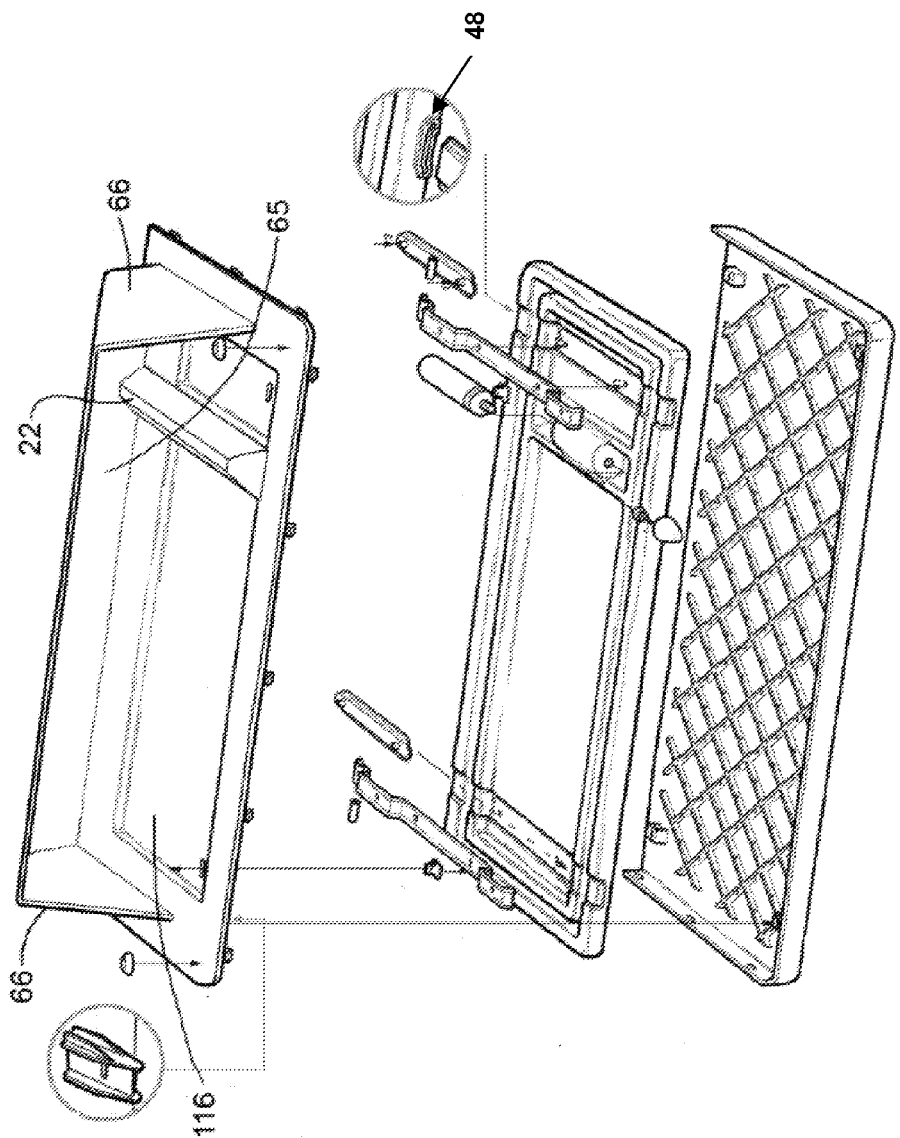
FIG. 8 is an exploded view of a passenger side active bolster in accordance with another embodiment of the present invention shown with an injection molded outer trim panel.

FIG. 8 shows an exploded view of another embodiment of the invention. The bin portion 116 has a protruding side 65 and end wall sections 66 forming an open ended container with a division from the protrusion 22. The container forms a space for an occupant to place or store items.

Figure 9:
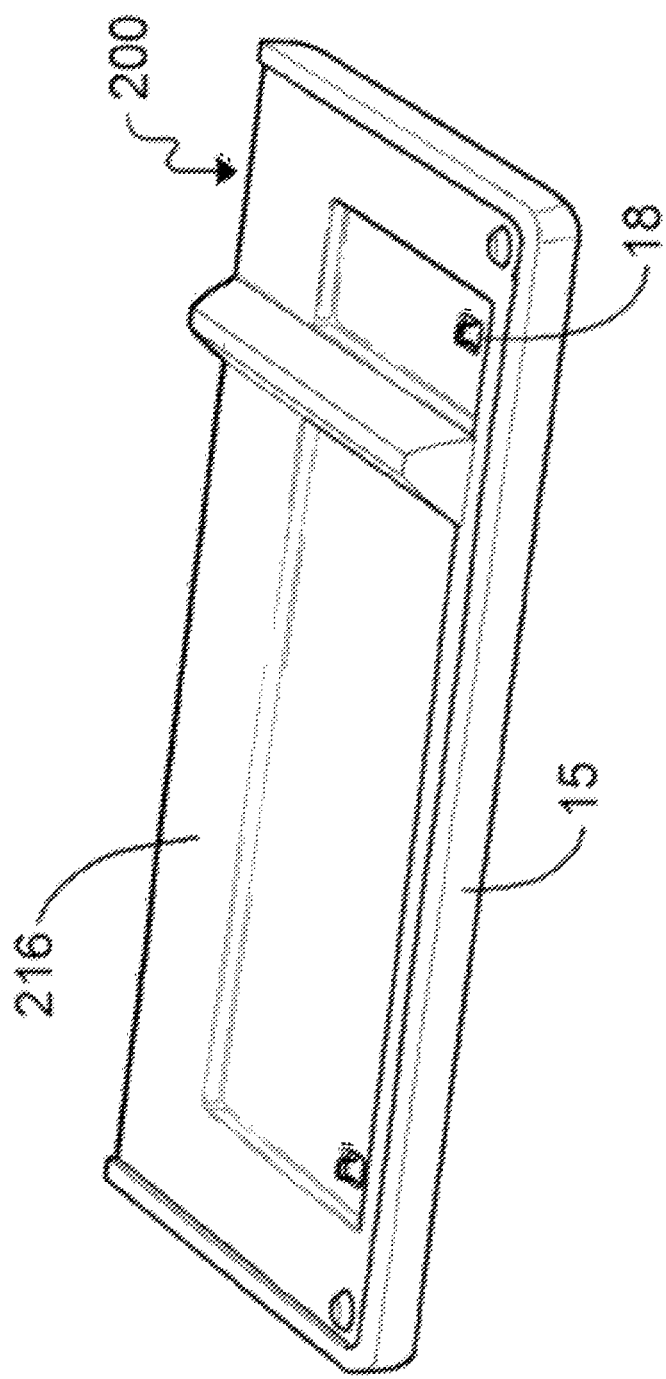
FIG. 9 is a perspective view of a passenger side active bolster in accordance with the principles of the present invention shown with an injection molded outer trim panel.

FIG. 9 shows the glove box assembly 200 that includes a rigid bin portion 216 that extends away from the door portion 15. A striker member 18 projects from the support structure 251 through the bin portion 216. The striker member 18 may engage a corresponding latching mechanism (not shown) to hold the door portion 15 in place. The bin portion 216 has molded-in key slots 217 (not shown) that match with key features (not shown) on the external support structure 251.

Figure 10:
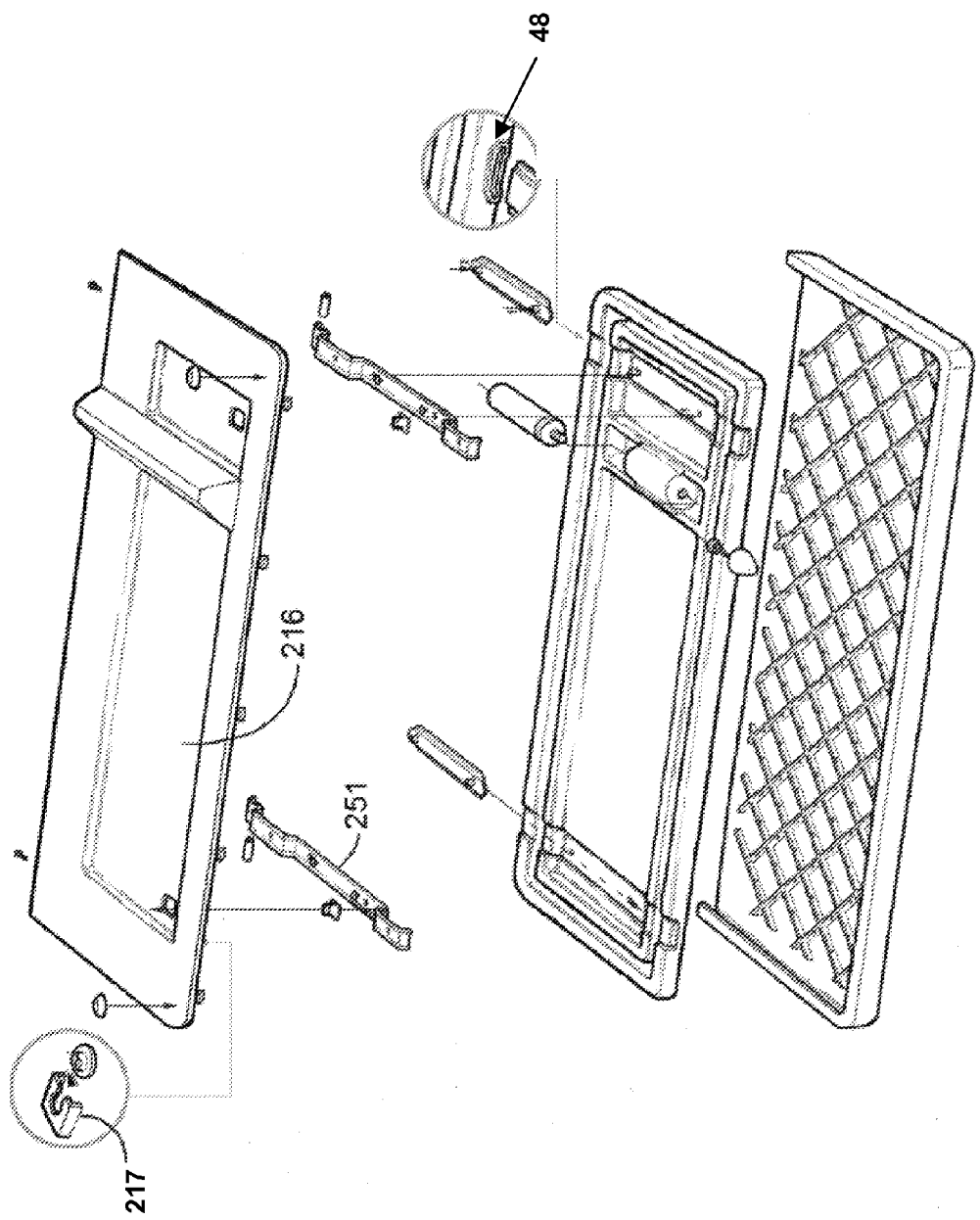
FIG. 10 is an exploded view of a passenger side active bolster in accordance with another embodiment of the present invention shown with an injection molded outer trim panel.

FIG. 10 shows another embodiment of the present invention. A key slot 217 holds bin portion 216 to the external support structure 251.

Figure 11:
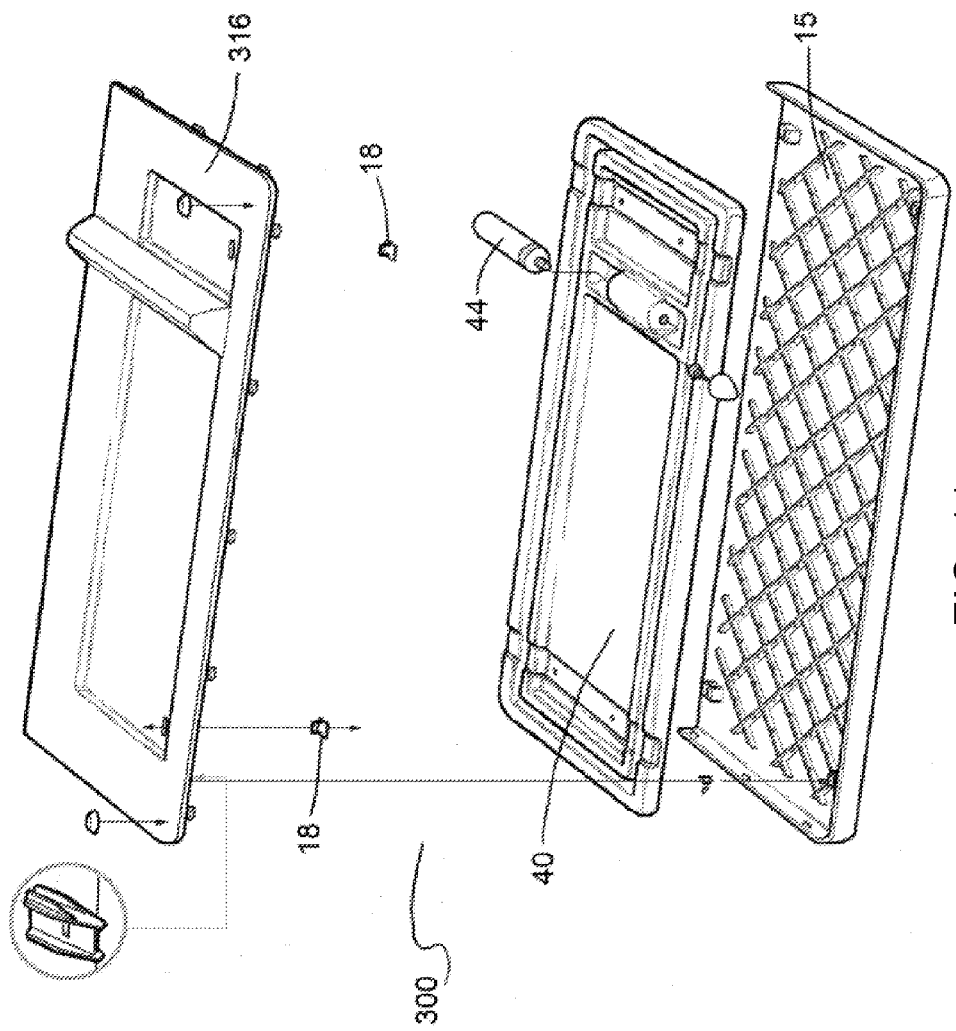
FIG. 11 is an exploded view of a passenger side active bolster in accordance with another embodiment of the present invention shown with an injection molded outer trim panel.

FIG. 11 shows yet another embodiment of the invention. The glove box assembly 300 that includes a rigid bin portion 316 that extends away from the door portion 15. A striker member 18 projects from the bladder 40 through the bin portion 316. The striker member 18 may engage a corresponding latching mechanism (not shown) to hold the door portion. It may be advantageous to use the bin portion as the reaction surface to the bladder 40 upon the activation of an inflator 44. The rigid bin portion 316 is not restricted to one form and may be configured with forms such as with a storage feature as described with the alternate bin structure 116 that has storage capacity.

Figure 12:
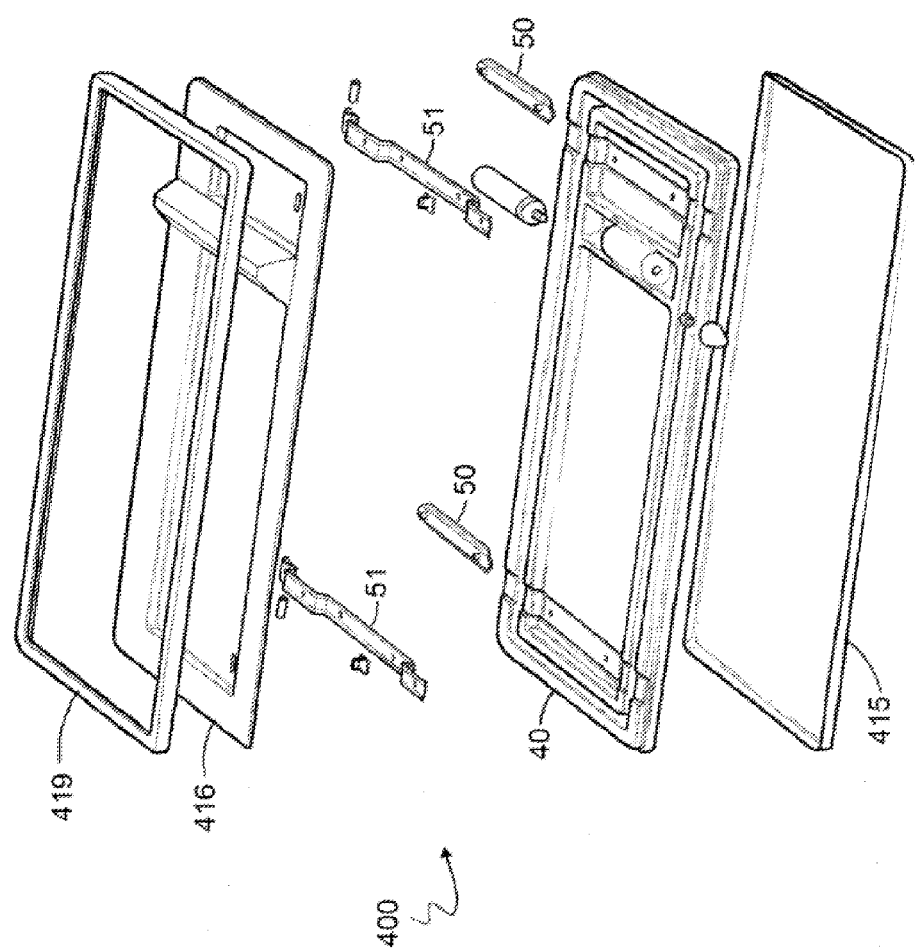
FIG. 12 is an exploded view of a passenger side active bolster in accordance with another embodiment of the present invention with a skin and frame.

FIG. 12 shows another embodiment of the invention with a skin 415 as the appearance surface viewed by the occupant. Skin 415 is affixed to bin portion 416 preferably by a welding process. A frame 419 is affixed to the bin portion 416 preferably by a welding process to hide any gaps on the sidewalls of the bonded assembly. An alternate embodiment of the glove box assembly 400 includes removing the internal support structures 50, 51 relying on the bin portion 416 to be the reaction surface of the deploying bladder 40.

An alternate embodiment to the assembly bin portion 416 is a structure with protruding walls for a storage container as previously disclosed and shown in FIG. 8.

The skin 415 may be a thermoplastic piece such as polypropylene, TPO, or PVC, a woven fabric from natural or synthetic materials, a synthetic leather, a composite leather of natural and man made components or a leather.

The skin 415 may be affixed to the bladder 40 by an in-mold, blow molding process. The skin may be advantageously perforated to eliminate air entrapment during the molding process. The skin may be serrated to eliminate air entrapment and to advantageously enable tearing during deployment.

The skin 415 may be formed independently by a molding process including injection molding, compression molding or thermoforming.

Figure 13:
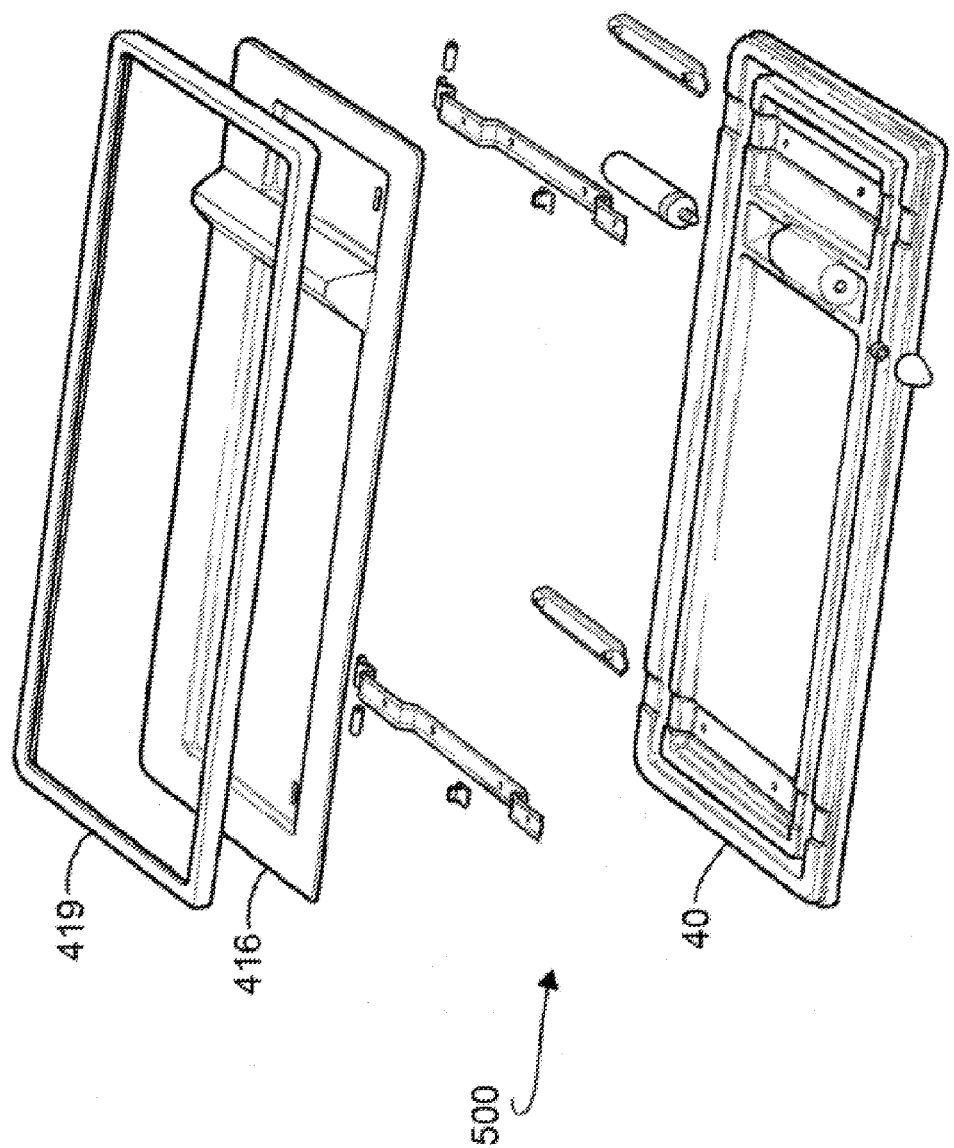
FIG. 13 is an exploded view of a passenger side active bolster in accordance with another embodiment of the present invention with a frame.

FIG. 13 shows an embodiment of the glove box assembly 500 having a frame 419 to hide potential gaps from the bonding of the bladder 40 to the bin portion 416. The occupant sees the show surface of the bladder 40. The show surface is preferably grained. The show surface may be painted.

In accordance with an aspect of at least one embodiment of the present invention, there is provided an energy management system for mounting in a vehicle 12. For example, exemplary embodiments are illustrated in FIGS. 3, 4, 5, 12, and 13. The energy management system comprises an inflatable bolster 40 and a support structure 50, 51. The inflatable bolster 40 is configured to mount in a glove box door 15 of a glove box of the vehicle, and includes an expansible hollow interior, an inflator module 44 for inflating the expansible hollow interior by releasing a suitable gas that can be stored under pressure in the inflator module 44, a front wall for projecting inwardly into the vehicle 12 and away from the glove box 10 on inflation of the expansible hollow interior, and a back wall 42 located between the expansible hollow interior and the glove box. The support structure 50, 51 is configured for mounting to the inflatable bolster 40. The support structure 50, 51 is operable to resist the inflatable bolster 40 being dislodged from the glove box and resist the back wall 42 being forced into the glove box due to inflation of the inflatable bolster 40.

In accordance with an aspect of a further embodiment of the present invention, there is provided an energy management system for mounting in a vehicle 10 as shown, for example, in FIGS. 6B and 6C. The support structure 50, 51 comprises an internal support structure 50 for mounting in the expansible hollow interior, and an external support structure 51 for mounting outside the expansible hollow interior. The internal support structure 50 can be engaged with the external support structure 51 to form a unitary support structure 50, 51 that is operable to resist bending due to the force of inflation of the inflatable bolster 40.

The internal support structure 50 may comprise a first internal support strip 50 and a second internal support strip 50, as shown, for example, in FIGS. 3, 4, 5, 10, 12, and 13. The external support structure 51 may comprise a first external support strip 51 and a second external support strip 51. The first internal support strip 50 and the first external support strip 51 can be engaged and the second internal support strip 50 and the second external support strip 51 can be engaged.

The first external support strip 51 may comprise a first hinged end 53 and a first free end, and the second external support strip 51 may comprise a second hinged end 53 and a second free end. The first hinged end 53 and the second hinged end 53 can be hingedly secured to the front dash panel 11 of the vehicle 12 that may permit the glove box door to open and close, allowing access to the glove box. The first free end and the second free end may comprise a latching mechanism 18, 56 for engaging the first free end and the second free end with the front dash panel 11 of the vehicle 12. The latching mechanism 18, 56 may permit the glove box door 15 to remain closed. The latching mechanism 18, 56 may be disengageable to permit the glove box door 15 to open to allow access to the glove box. The latching mechanism 18, 56 may be operable to remain engaged during inflation of the inflatable bolster 40.

The inflatable bolster 40 can be configured to inflate in a direction substantially orthogonal to the front wall. The latching mechanism 18, 56 can be disengaged by being moved in a direction substantially orthogonal to the expansion direction of the inflatable bolster 40.

The internal support structure 50 and the external support structure 51 can be metal.

The external support structure 51 has a combined total strip area facing the back wall 42 of the inflatable bolster 40. The back wall 42 has a total back wall area and the combined total strip area may be less than half the total back wall area.

The combined total strip area can be less than a fifth of the total back wall area.

The inflatable bolster 40 may comprise a vent aperture 48 for facilitating deflation of the inflatable bolster 40. The vent aperture 48 can be dimensioned such that the internal support structure 50 is insertable via the vent aperture 48, as shown, for example, in FIGS. 3 and 6B.

The vent aperture 48 may comprise a first vent 48 dimensioned such that the first internal support strip 50 can be inserted via the first vent 48, and a second vent 48 dimensioned such that the second internal support strip 50 can be inserted via the second vent 48.

Optionally, the glove box door 15 may comprise a substantially planar glove box surface and reinforcing ribs 26 extending substantially perpendicularly from the glove box door 15. The ribs 26 can be operable to reinforce the glove box door 15 and can be operable to crumble on inflation of the inflatable bolster 40 that pushes the glove box door 15 out of the glove box.

In accordance with an aspect of at least one embodiment of the present invention, there is provided a method of assembling an energy management system for mounting in a vehicle 10 as shown, for example, in FIGS. 3, 4, 5, 12, and 13. An inflatable bolster 40 for mounting in a glove box door 15 of a glove box of the vehicle 10 is provided. The inflatable bolster 40 can include an expansible hollow interior, an inflator module 44 for inflating the expansible hollow interior, a front wall for projecting inwardly into the vehicle 10 and away from the glove box on inflation of the expansible hollow interior, a back wall 42 located between the expansible hollow interior and the glove box, and a vent aperture 48 for facilitating deflation of the inflatable bolster 40. An internal support structure 50, and an external support structure 51 can be provided. The internal support structure 50 can be inserted into the expansible hollow interior via the vent aperture 48. The internal support structure 50 can be engaged with the external support structure 51 to form a unitary support structure 50, 51. The unitary support structure 50, 51 can be operable to resist the inflatable bolster 40 being dislodged from the glove box and resist bending due to a force of inflation of the inflatable bolster 40.

In accordance with an aspect of at least one embodiment of the present invention, there is provided an energy management system and glove box compartment for mounting in a vehicle 10 as shown, for example, in FIGS. 3, 4, 5, 12, and 13. The glove box can have a glove box door and a glove box interior dimension. The energy management system and glove box compartment may comprise an inflatable bolster 40 for mounting in the glove box door 15 of the glove box. The inflatable bolster 40 can include an expansible hollow interior, an inflator module 44 for inflating the expansible hollow interior, a front wall for projecting inwardly into the vehicle 10 and away from the glove box on inflation of the expansible hollow interior, and a back wall 42 located between the expansible hollow interior and the glove box. The energy management system and glove box compartment may comprise a support structure 50, 51 for mounting to the inflatable bolster 40. The support structure 50, 51 may have a support structure dimension that is larger than the glove box dimension, and the support structure 50, 51 can span the glove box dimension. The support structure 50, 51 can be operable to resist the inflatable bolster 40 being dislodged from the glove box and resist the back wall 42 being forced into the glove box due to inflation of the inflatable bolster 40.

The description of the invention is merely exemplary in nature, and thus, variations that do not depart from the gist of the invention are intended to be within the scope of the invention.

What is claimed is:

1. An energy management system for mounting in a vehicle, the energy management system comprising:
   an inflatable bolster for mounting in a glove box door of a glove box of the vehicle, the inflatable bolster including an expansible hollow interior, an inflator module for inflating the expansible hollow interior, a front wall for projecting inwardly into the vehicle and away from the glove box on inflation of the expansible hollow interior, and a back wall located between the expansible hollow interior and the glove box; and
   a support structure for mounting to the inflatable bolster, the support structure being operable to resist the back wall being forced into the glove box due to inflation of the inflatable bolster.

2. The energy management system as defined in claim 1, wherein the support structure comprises:
   an internal support structure for mounting in the expansible hollow interior; and
   an external support structure for mounting outside the expansible hollow interior;
   wherein the internal support structure is engaged with the external support structure to form a unitary support structure that is operable to resist bending due to the force of inflation of the inflatable bolster.

3. The energy management system as defined in claim 2, wherein:
   the internal support structure comprises a first internal support strip and a second internal support strip; and
   the external support structure comprises a first external support strip and a second external support strip;
   wherein the first internal support strip and the first external support strip are engaged; and
   the second internal support strip and the second external support strip are engaged.

4. The energy management system as defined in claim 3, wherein:
   the first external support strip comprises a first hinged end and a first free end, and the second external support strip comprises a second hinged end and a second free end;
   the first hinged end and the second hinged end are hingedly secure to a front dash panel of the vehicle such that the glove box door is operable to open and close; and
   the first free end and the second free end comprises a latching mechanism for engaging the first free end and the second free end with the front dash panel of the vehicle to hold the glove box door closed, the latching mechanism being disengageable to open the glove box door to provide access to the glove box, wherein the latching mechanism is operable to remain engaged during inflation of the inflatable bolster.

5. The energy management system as defined in claim 4, wherein:
   the inflatable bolster is configured to inflate in a direction substantially orthogonal to the front wall; and,
   the latching mechanism is disengaged by being moved in a direction substantially orthogonal to the expansion direction of the inflatable bolster.

6. The energy management system as defined in claim 5, wherein:
   the internal support structure and the external support structure are metal.

7. The energy management system as defined in claim 6, wherein:
   the external support structure comprises a combined total strip area facing the back wall of the inflatable bolster;
   the back wall has a total back wall area; and
   the combined total strip area is less than half the total back wall area.

8. The energy management system as defined in claim 7, wherein the combined total strip area is less than a fifth of the total back wall area.

9. The energy management system as defined in claim 7, wherein the inflatable bolster further comprises a vent aperture for facilitating deflation of the inflatable bolster, the vent aperture being dimensioned such that the internal support structure is insertable via the vent aperture.

10. The energy management system as defined in claim 9, wherein the vent aperture comprises
    a first vent dimensioned such that the first internal support strip is insertable via the first vent; and
    a second vent dimensioned such that the second internal support strip is insertable via the second vent.

11. The energy management system as defined in claim 10, wherein the glove box door comprises a substantially planar glove box surface and reinforcing ribs extending substantially perpendicularly from the glove box door, wherein the ribs are operable to reinforce the glove box door, and are operable to crumble on inflation of the inflatable bolster pushing the glove box door out of the glove box.

12. A method of assembling an energy management system for mounting in a vehicle, the method comprising:
    providing an inflatable bolster for mounting in a glove box door of a glove box of the vehicle, the inflatable bolster including an expansible hollow interior, an inflator module for inflating the expansible hollow interior, a front wall for projecting inwardly into the vehicle and away from the glove box on inflation of the expansible hollow interior, a back wall located between the expansible hollow interior and the glove box; and a vent aperture for facilitating deflation of the inflatable bolster;
    providing an internal support structure, and an external support structure;

inserting the internal support structure into the expansible hollow interior via the vent aperture; and engaging the internal support structure with the external support structure to form a unitary support structure that is operable to bending due to a force of inflation of the inflatable bolster.

13. An energy management system and glove box compartment for mounting in a vehicle, the energy management system and glove box compartment comprising:

a glove box for mounting in the vehicle, the glove box having a glove box door and a glove box interior dimension;

an inflatable bolster for mounting in the glove box door of the glove box, the inflatable bolster including an expansible hollow interior, an inflator module for inflating the expansible hollow interior, a front wall for projecting inwardly into the vehicle and away from the glove box on inflation of the expansible hollow interior, and a back wall located between the expansible hollow interior and the glove box; and, a support structure for mounting to the inflatable bolster, the support structure having a support structure dimension larger than the glove box dimension, and spanning the glove box dimension, the support structure being operable to the back wall being forced into the glove box due to inflation of the inflatable bolster.

14. The energy management system and glove box compartment as defined in claim 13, wherein the support structure comprises:

an internal support structure for mounting in the expansible hollow interior; and an external support structure for mounting outside the expansible hollow interior;

wherein the internal support structure is engaged with the external support structure to form a unitary support structure that is operable to resist bending due to the force of inflation of the inflatable bolster.

15. The energy management system and glove box compartment as defined in claim 14, wherein:

the internal support structure comprises a first internal support strip and a second internal support strip; and the external support structure comprises a first external support strip and a second external support strip;

wherein the first internal support strip and the first external support strip are engaged; and the second internal support strip and the second external support strip are engaged.

16. The energy management system and glove box compartment as defined in claim 15, wherein:

the first external support strip comprises a first hinged end and a first free end, and the second external support strip comprises a second hinged end and a second free end;

the first hinged end and the second hinged end are hingedly secured to a front dash panel of the vehicle such that the glove box door is operable to pivot about the first hinged end and the second hinged end to open and close; and the first free end and the second free end comprises a latching mechanism for latching the first free end and the second free end to the front dash panel of the vehicle to hold the glove box door closed, the latching mechanism being disengageable to such that the glove box door is operable to pivot about the first hinged end and the second hinged end to open to provide access to the glove box, wherein the latching mechanism is operable to remain latched to the front dash panel of the vehicle during inflation of the inflatable bolster.

17. The energy management system and glove box compartment as defined in claim 16, wherein:

the inflatable bolster is configured to inflate in a direction substantially orthogonal to the front wall; and the latching mechanism is disengagable by being moved in a direction substantially orthogonal to the expansion direction of the inflatable bolster.

18. The energy management system and glove box compartment as defined in claim 17, wherein:

the internal support structure and the external support structure are metal.

19. The energy management system and glove box compartment as defined in claim 18, wherein:

the external support structure comprises a combined total strip area facing the back wall of the inflatable bolster;

the back wall has a total back wall area; and the combined total strip area is less than half the total back wall area.

20. The energy management system and glove box compartment as defined in claim 19, wherein the combined total strip area is less than a fifth of the total back wall area.

21. The energy management system and glove box compartment as defined in claim 19, wherein the inflatable bolster further comprises a vent aperture for facilitating deflation of the inflatable bolster, the vent aperture being dimensioned such that the internal support structure is insertable via the vent aperture.

22. The energy management system and glove box compartment as defined in claim 21, wherein the vent aperture comprises a first vent dimensioned such that the first internal support strip is insertable via the first vent; and a second vent dimensioned such that the second internal support strip is insertable via the second vent.

23. The energy management system and glove box compartment as defined in claim 22, wherein the glove box door comprises a substantially planar glove box surface and reinforcing ribs extending substantially perpendicularly from the glove box door, wherein the ribs are operable to reinforce the glove box door, and are operable to crumble on inflation of the inflatable bolster pushing the glove box door out of the glove box.

* * * * *